ns the United States Patent Office 3,116,816
Patented Jan. 7, 1964

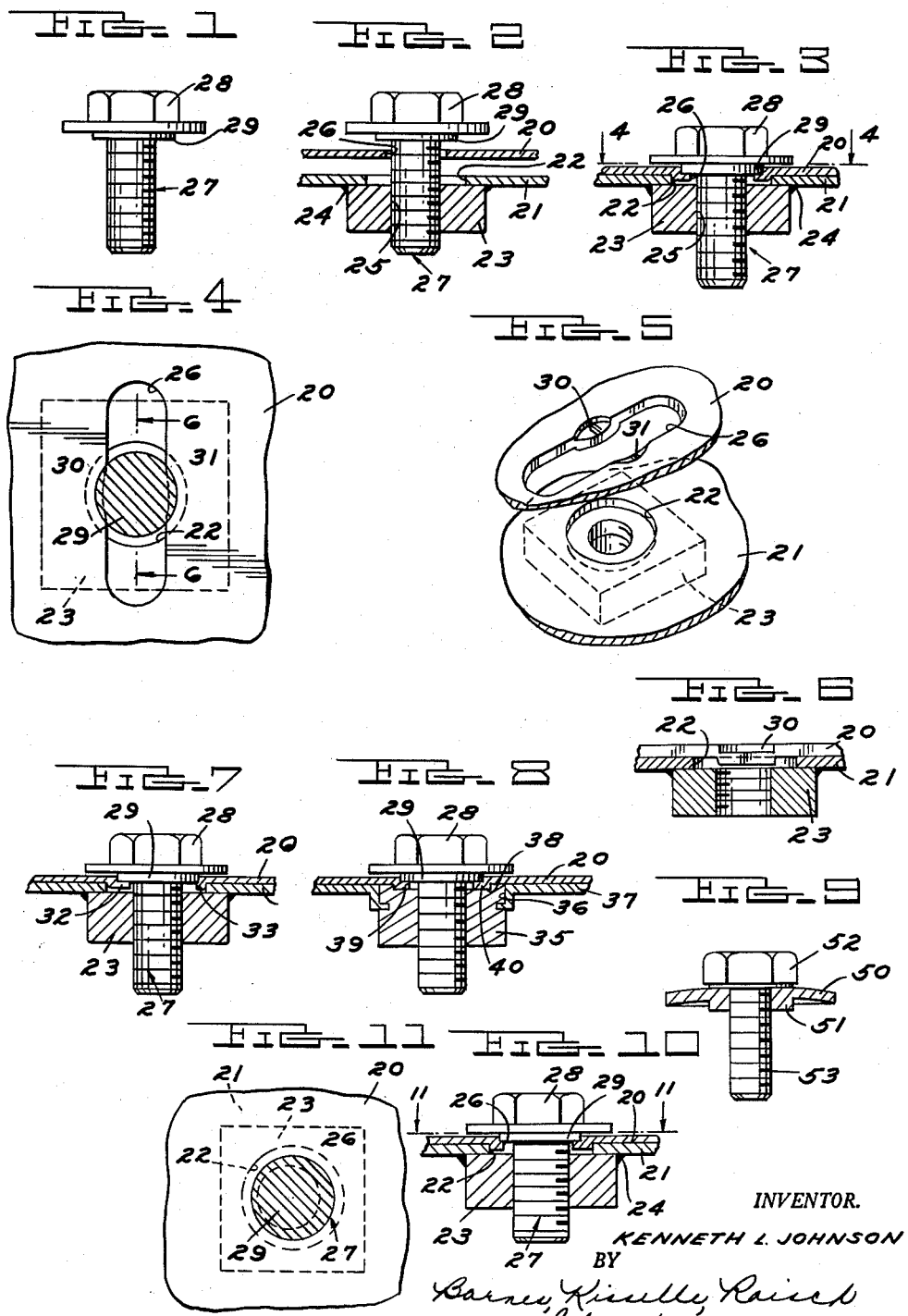

3,116,816
CONNECTING SHEET MATERIAL
Kenneth L. Johnson, % K. L. Johnson Co., 2660 W. 8th St., Erie, Pa.
Filed Nov. 8, 1960, Ser. No. 67,966
24 Claims. (Cl. 189—36)

This invention relates to the joining of members made of sheet material such as sheet metal and particularly to the joining of such members by using a bolt and nut.

In the manufacture of articles from parts, made from sheet material such as sheet metal, by utilizing a bolt and nut, one of the major problems is the alignment of the holes through which the bolt projects so that the parts may be rapidly and easily assembled. Such parts are found in automobiles, refrigerators, washing machines, air conditioners and the like. Because of the mass production of the parts, it is not possible to accurately form the holes so that perfect registration will occur at all times. The most common expedient which is used is to make the holes large enough so that the fastener in the form of a bolt or screw will readily enter even though there may be some misalignment of the holes. Another expedient is the use of cage type nuts which are mounted on one of the parts in such a fashion that there is a certain amount of permissible movement permitting the nut to become aligned with the bolt.

In either of the aforementioned cases, the two parts are only slidably clamped together so that the parts can move relative to one another the differenec between the hole diameters and the bolt diameter. Where space and functioning of the parts permits, some means of dowelling the parts to each other at assembly may be accomplished after the parts have been assembled but, in most instances, this is not feasible because of either design or cost.

The provision of embossed areas which match at assembly to provide a dowelling effect is unsatisfactory since the accuracy required to position the embossed areas cannot be achieved in mass production.

Because the joint between the sheet members is a slidable clamping type, a high clamping force is required to prevent any movement between the parts. In normal practice, the nuts and bolts are tightened to within 75 percent of the rated stripping strength of the bolt and nut. This imposes a burden of very close control over power wrenching procedures and settings in order that the fasteners may be consistently tightened to the required high-torque values without exceeding the stripping strengths. In addition, the higher clamping forces required necessitate the use of larger and higher strength bolts and nuts.

Although such joints provide satisfactory clamping at assembly, it is not usually possible to maintain the tightness of the joint during the life of the article. Even though lock nuts, lock washers and other similar devices are employed, the joint tends to become loosened upon use of the article. This tendency to loosen is further increased by the fact that in most instances short bolts are used so that the elasticity which would be inherent in a longer bolt is not present to overcome the tendency to loosen. Even a slight loosening of the bolt and nut results in a substantial drop in the clamping force so that sliding movement may occur between the two parts. Because the parts are normally painted prior to assembly, the slight sliding movement permitted by this loosening results in a rapid breakdown of the paint thereby providing a further loosening of the joint.

It is therefore an object of this invention to provide a joint between sheet members made of relatively thin material wherein the members are simultaneously clamped and assembled against relative sliding movement.

It is a further object of this invention to provide such a joint wherein the members are effectively and easily clamped to one another with a minimum clamping pressure.

It is a further object of the invention to provide such a joint wherein the openings in the respective members need not be accurately aligned.

It is a further object of the invention to provide such a joint wherein a minimum clamping force provides a maximum tendency to resist sliding between the two sheet members.

Basically, the joint embodying the invention comprises partially aligned and registered openings which have different dimensions in the respective sheet members and a fastener which extends through the openings and means for deforming a portion of the opening having a lesser dimension into the opening having a greater dimension to thereby clamp and lock the sheet members against relative sliding movement.

More specifically, the joint embodying the invention comprises openings in the adjacent sheet members, one opening having a greater dimension than the other in the registering or overlying portions theerof. A fastener, preferably in the form of a bolt having a head, is inserted through the aligned portions of the opening and a nut is threaded on the bolt. Means defining a shoulder, either integral with one of the head or nut or on a washer, is provided adjacent the member which has the smaller dimensioned opening so that when the bolt and nut are tightened the shoulder deforms the material of the member having a smaller opening into the opening of the other member. The opening having the greater dimension is preferably circular and the shoulder is cylindrical while the opening having the lesser dimension is in the form of a slot so that the portion of the edges of the slot are deformed into the arcuate edges of the circular opening. The invention may comprise different embodiments as more fully described below.

In the drawings:

FIG. 1 is an elevation of a bolt embodying the invention.

FIG. 2 is a part sectional elevation through a joint embodying the invention showing the parts before the bolt and nut are tightened.

FIG. 3 is a view similar to FIG. 2 showing the joint in assembled relation.

FIG. 4 is a sectional view taken along the line 4—4 in FIG. 3.

FIG. 5 is an exploded view of the joint shown in FIG. 3, parts being taken away.

FIG. 6 is a sectional view taken along the line 6—6 in FIG. 4, parts being broken away.

FIG. 7 is a part sectional elevation similar to FIG. 3 showing a slight misalignment of the parts.

FIG. 8 is a sectional elevation through a modified form of joint.

FIG. 9 is a sectional elevation of a modified form of bolt and washer used in the joint.

FIG. 10 is a sectional elevation of a further modified form of joint.

FIG. 11 is a sectional view taken along the line 11—11 in FIG. 10.

Referring to FIGS. 1 through 5, the joint is adapted to be used in assembling parts made from sheet material, such as sheet metal, wherein portions of the parts are in substantially contiguous and coextensive relation as shown in the sheet members 20, 21. As shown in FIGS. 1 to 5, sheet member 21 is formed with a circular opening 22 and a nut 23 is fixed to the surface of sheet member 21 in a suitable manner as by welding as at 24. The nut is positioned so that the center of the opening 25 therein is in alignment with the center of the opening 22 in sheet member 21. Sheet member 20 is formed with a slot 26 so that there is permissible movement between the sheet members 20, 21 in order to accommodate misalignment between the parts of which the members form a part. The width of the slot 26 is less than the diameter of the circular opening 22 in sheet member 21. A bolt 27 having a head 28 and a cylindrical shoulder 29 on the underside of the head 28 is inserted through openings 26, 22 and threaded into nut 23. As the bolt is threaded into the nut, the shoulder 29 engages the portions of the member 20 adjacent the edge of the slot 26 and deforms and embosses these portions downwardly into the opening 22. This produces embossed portions 30, 31 that engage the arcuate edge of the opening 22 and effectively prevent the members 20, 21 from sliding relative to one another in any direction parallel to the planes thereof.

In order to insure that no movement exists between the sheet members 20, 21, the width of the slot 26 should not exceed the diameter of the bolt 27 by more than one-half the amount that the diameter of the shoulder 29 is greater than the bolt diameter. This insures that, in the condition of greatest mismatch between the bolt and the slot 26, the edge of the slot 26 which is not engaged by the shoulder 29 will abut the shoulder 29 and thus prevent any sliding movement.

In cases where an absolute positive locking between the members 20, 21 is not necessary, the width of the slot 26 can be increased permitting a greater permissible mismatch but, obviously, in no case should the width of the slot 26 be greater than the diameter of the embossing shoulder 29. For best results, the height of the embossing shoulder 29 should not exceed one-half the total thickness of the sheet members 20, 21. This will insure seating of the bolt on the members. Thus, for ¼ inch-20 bolts, the height of the embossing shoulder 29 should be about 0.020 inch. Such a bolt would be used in a range of metal thicknesses from .020 inch to .035 inch.

As shown in FIG. 7, a mismatch can occur between the openings 26 in the member 20 and the bolt 29 so that the embossed portions 32, 33 are not symmetrical.

It can thus be seen that by a slight pressure sufficient to deform the edges of the opening 26, the members 20, 21 are effectively embossed or dowelled together so that even if the bolt and nut are loosened, no sliding movement will occur within the limits of the accuracy of manufacture. It has been found that such a joint has a substantially greater strength than has been heretofore possible.

As shown in FIG. 8, instead of providing an opening in the member 21, a clinch-type nut 35 can be provided in an opening 36 in sheet member 37 which is formed with a cylindrical recess 38 that takes the place of the opening 22 in sheet member 21. When the shoulder 29 engages the edges of the slot 26, the portions adjacent the edges are deformed as at 39 and 40 into the cylindrical opening or recess in the nut 35 embossing and clinching the member 37 to the member 20.

Instead of providing a slot 26 in sheet member 20, a circular opening may be provided as shown in FIGS. 10 and 11 so that when the shoulder engages the edges of the opening an annular boss or deformed area is provided.

Instead of providing the shoulder directly on the head of the bolt, the shoulder may be formed as a part of the washer interposed between the head of the bolt and the member 20. For example, as shown in FIG. 9, a Belleville washer 50 having an annular cylindrical shoulder 51 is interposed beneath the head 52 of a conventional bolt 53. The use of a Belleville washer 50 provides a locking action when the washer is compressed thereby reducing the tendency of the joint to loosen in use.

It can thus be seen that I have provided a joint which effectively clamps the two sheet members together with a minimum of force and which will retain the members against sliding even though the bolt and nut which forms part of the joint is loosened.

I claim:

1. In a joint between contacting sheets of material, the combination comprising a pair of sheets having partially aligned and registering openings therein, one of said openings being a slot and the other of said openings being circular, the diameter of said circular opening being greater than the width of said slot, and a fastener extending through said openings and including means complementary in shape to said circular opening deforming the edges of the slot only into said circular opening.

2. In a joint between contacting sheets of material, the combination comprising a first sheet having an opening therethrough, a second sheet having an opening therethrough, said openings being in partial alignment and registry, the opening in said first sheet having a greater dimension than the adjacent and corresponding dimension of the opening in said second sheet, said sheets having spaced parallel surfaces, the adjacent surfaces of said sheets being in contact, a fastener extending through aligned portions of the openings, means on one end of said fastener adapted to engage the other surface of said first member in the area surrounding the opening therein substantially in the plane of said other surface of said first member, means on the other end of said fastener adapted to apply a force to the other surface of said second sheet, said opening in said first sheet having an edge at the area which overlies the opening in said second sheet which is non-straight, the edge of the opening in said second sheet adjacent said non-straight edge being straight, and means interposed between said latter means on said fastener and said second sheet including a projection complementary in shape to said non-straight edge adapted to engage said second sheet and deform said second sheet into the opening in said first sheet.

3. In a joint between contacting sheets of material, the combination comprising a first sheet having a circular opening therethrough, a second sheet having an opening therethrough, said openings being in partial alignment and registry, the circular opening in said first sheet having a greater diameter than the adjacent and corresponding dimension of the opening in said second sheet, said sheets having spaced parallel surfaces, the adjacent surfaces of said sheets being in contact, a fastener extending through said aligned portions of the openings, means on one end of said fastener adapted to engage the other surface of said first member in the area surrounding the opening therein and substantially in the plane of said other surface of said first member, means on the other end of said fastener adapted to apply a force to the other surface of said second sheet, and embossing means interposed between said latter means and said second sheet including a projection complementary in shape to said circular opening adapted to engage said second sheet and deform said second sheet into the circular opening in said first sheet.

4. The combination set forth in claim 3 wherein said embossing means has an arcuate edge defining a shoulder.

5. The combination set forth in claim 3 wherein the opening in said second sheet comprises a slot having a width less than the diameter of said circular opening in said first sheet.

6. The combination set forth in claim 3 wherein the opening in said second sheet is circular and has a diameter less than the diameter of the opening in said first sheet.

7. The combination set forth in claim 3 wherein said embossing means comprises a cylindrical shoulder.

8. The combination set forth in claim 7 wherein said cylindrical shoulder forms a part of an integral head on the fastener.

9. The combination set forth in claim 7 including a washer, said shoulder forming a part of said washer.

10. In a joint between contacting sheets of material, the combination comprising a first sheet member having an opening therein, a second sheet member having an opening therein, said openings being in partial alignment and registry, the opening in said first member having an arcuate edge in the registering portion thereof, the opening in said second member having a straight edge in the registering portion thereof, the opening in said first member having a greater width in the registering portion thereof than the opening in said second member, said members having opposite surfaces, the adjacent surfaces of the members being in contact, a bolt extending through the aligned portions of said openings, said bolt having a head at one end thereof and a nut threaded on the other end thereof, means fixing said nut relative to said opening in said first member, means defining a shoulder having arcuate edges complementary in shape to the arcuate edge of the opening in said first member interposed between one of said nut and said head and the sheet having the opening of lesser width, the other of said nut and said head engaging the other surface of the first sheet member such that when the bolt and nut are tightened the shoulder engages and deforms the material adjacent said opening said second member into the opening of said first member along said arcuate portion of the opening in said first member.

11. The combination set forth in claim 10 wherein said nut is centered relative to the width of the opening in said first member.

12. The combination set forth in claim 10 wherein said opening in said second sheet member comprises a slot.

13. The combination set forth in claim 10 wherein said means defining a shoulder is interposed between the head of the bolt and the first sheet member.

14. The combination set forth in claim 13 wherein said shoulder is an integral part of said head.

15. The combination set forth in claim 13 including a washer interposed between the head and the first sheet member, said shoulder forming part of said washer.

16. In a joint between contacting sheets of material, the combination comprising a first sheet member having a circular opening therein, a second sheet member having an opening therein, said openings being in partial alignment and registry, the opening in said second member having a straight edge in the registering portion thereof, the diameter of the opening in said first member being greater than the width of the opening in said second member, said members having opposite surfaces, the adjacent surfaces of the members being in contact, a bolt extending through the aligned portions of said openings, said bolt having a head at one end thereof, a nut threaded on the other end of said bolt, means for fixing said nut in centered relation to said opening in said first member, means defining a circular shoulder having arcuate edges interposed between one of said head adjacent the sheet having the opening of lesser width, said nut engaging the other surface of the first sheet member such that when the bolt and nut are tightened the shoulder engages and deforms the material adjacent said opening in said second member into the circular opening of said first member along said arcuate portions of the opening in said first member.

17. The combination set forth in claim 16 wherein said shoulder comprises an integral part of the head of the bolt.

18. The combination set forth in claim 16 including a washer interposed between the head of the bolt and the first member, said shoulder forming an integral part of said washer.

19. The combination set forth in claim 16 wherein said nut is held in fixed position on said second member with its axis aligned with the axis of said circular opening by welding.

20. In a joint between contacting sheets of material, the combination comprising a first sheet member having a circular opening therein, a second sheet member having a slot therein, the diameter of said circular opening in said first sheet member being greater than the width of said slot in said second sheet member, a nut, means for fixing said nut on a surface of said first sheet member with the axis thereof substantially centrally located with respect to the circular opening, a bolt having a head, said bolt extending through the slot and being threaded into said nut, and means providing a cylindrical shoulder between the head of said bolt and said second sheet member, said shoulder embossing the portion of said second sheet member into the circular opening of said first sheet member when the bolt is tightened.

21. The combination set forth in claim 20 wherein said shoulder forms an integral part of the head of said bolt.

22. The combination set forth in claim 20 including a washer interposed between the head and the second member, said shoulder forming an integral part of said washer.

23. The combination set forth in claim 22 wherein said washer comprises a Belleville type spring washer whereby said washer provides a locking action when compressed.

24. In a joint between contacting sheets of material, the combination comprising a first sheet member having a circular opening therein, a second sheet member having a slot therein, the diameter of said circular opening in said first sheet member being greater than the width of said slot in said second sheet member, a nut, means for clinching said nut in said opening in said first sheet member with its axis aligned with the axis of said last mentioned opening, a bolt having a head, said bolt extending through the slot and being threaded into said nut, said nut having a circular recess in the surface thereof surrounding said bolt, said recess having a diameter greater than the width of said slot, and means providing a cylindrical shoulder adjacent the head of said bolt and said second sheet member, said sheet deforming a portion of said second sheet member into the recess of said nut when the bolt is tightened.

References Cited in the file of this patent

UNITED STATES PATENTS

| | | |
|---|---|---|
| 1,969,796 | Hoke | Aug. 14, 1934 |
| 2,374,743 | Granville | May 1, 1945 |
| 2,432,257 | Stetzer | Dec. 9, 1947 |
| 2,517,012 | Miller | Aug. 1, 1950 |